United States Patent
Koskey, Jr.

(10) Patent No.: US 8,015,942 B2
(45) Date of Patent: Sep. 13, 2011

(54) HEATED PET BED

(75) Inventor: James Donald Koskey, Jr., Manitou Springs, CO (US)

(73) Assignee: K & H Manufacturing, LLC, Colorado Springs, CO (US)

(*) Notice: Subject to any disclaimer, the term of this patent is extended or adjusted under 35 U.S.C. 154(b) by 807 days.

(21) Appl. No.: 11/398,920

(22) Filed: Apr. 6, 2006

(65) Prior Publication Data

US 2007/0234964 A1    Oct. 11, 2007

(51) Int. Cl.
*A01K 29/00* (2006.01)
(52) U.S. Cl. ...................................... 119/28.5
(58) Field of Classification Search ............ 119/508, 119/526, 28.5
See application file for complete search history.

(56) References Cited

U.S. PATENT DOCUMENTS

| | | | | |
|---|---|---|---|---|
| 2,717,949 | A * | 9/1955 | Challenner | 219/618 |
| 4,162,393 | A * | 7/1979 | Balboni | 219/217 |
| 5,524,308 | A * | 6/1996 | Hwang et al. | 5/644 |
| 5,660,438 | A * | 8/1997 | Tedesco | 297/284.6 |
| 5,735,003 | A * | 4/1998 | Judge | 5/413 AM |
| 6,084,209 | A * | 7/2000 | Reusche et al. | 219/217 |
| 6,163,907 | A * | 12/2000 | Larson | 5/691 |
| 6,171,333 | B1 * | 1/2001 | Nelson et al. | 607/104 |
| 6,189,487 | B1 * | 2/2001 | Owen et al. | 119/28.5 |
| 6,839,922 | B1 * | 1/2005 | Foggett et al. | 5/421 |
| 2001/0045372 | A1 * | 11/2001 | Curley et al. | 206/525 |
| 2003/0183550 | A1 * | 10/2003 | DiLiberto, Jr. | 206/524.8 |
| 2006/0278628 | A1 * | 12/2006 | Foggett et al. | 219/217 |
| 2007/0107134 | A1 * | 5/2007 | Pittman | 5/713 |

* cited by examiner

*Primary Examiner* — Joshua J Michener
*Assistant Examiner* — Joseph W Sanderson
(74) *Attorney, Agent, or Firm* — Dale B. Halling

(57) ABSTRACT

An outdoor heated pet bed has a low wattage heating wire. A foil packet encloses the low wattage heating wire. A foam layer is placed adjacent to one side of the foil packet. A weather resistant cover encloses the foam layer and the foil packet.

14 Claims, 2 Drawing Sheets

HEATED PET BED

RELATED APPLICATIONS

None.

FIELD OF THE INVENTION

The present invention relates generally to the field of pet products and more particularly to a heated pet bed.

BACKGROUND OF THE INVENTION

It is common for dogs and other pets to spend all or part of the day outside even in the winter. When the temperature outside is cold, the dog may require supplemental heat to maintain its body temperature. However, maintaining a warm bed is expensive for the homeowner. In addition, the cost of purchasing a heated bed is expensive. A good deal of the cost of purchasing a heated pet bed is in the shipping cost, which adds no value to the owner.

Thus there exists a need for a heated pet bed that is economical to operate and economical to purchase.

SUMMARY OF INVENTION

An outdoor heated pet bed that overcomes these and other problems has a low wattage heating wire. A foil packet encloses the low wattage heating wire. A foam layer is placed adjacent to one side of the foil packet. A weather resistant cover encloses the foam layer and the foil packet. The foil packed may be electrically grounded. A thermostat may control a current to the low wattage heating wire. The foam layer may be fire retardant. The foam layer may be glued to one side of the foil packet. An electrical cord covered by a metal spring may be electrically coupled to the low wattage heating wire. An air nozzle may be placed in the weather resistant cover.

In one embodiment, a heated pet bed has a low wattage heater. A weather resistant cover encloses the low wattage heater. An air nozzle is placed in the weather resistant cover. A foil packet may enclose the low wattage heater. A pair of foam layers may encompass the foil packet. The pair of foam layers may be adhered to the foil packet. An electrical cord may be covered by a metal spring electrically coupled to the low wattage heater.

In one embodiment, a heated pet bed has a low wattage heater. An insulating layer surrounds the low wattage heater. A cover encloses the insulating layer. The cover may include an air nozzle in the cover. The insulating layer may be fire retardant. The insulating layer may be compressible. The insulating layer may be electrically insulating. The insulating layer may be thermally insulating. The insulating layer may be less thermally insulating in a compressed state than a non-compressed state.

DETAILED DESCRIPTION OF THE DRAWINGS

The heated pet bed described herein overcomes the problems of high operating costs and high purchase price associated with present heated pet beds. The present heated pet bed uses a low wattage heating wire (less than 100 watts) in combination with a thermally insulating material, which significantly reduces the operating cost. In addition, the present heated pet bed has an air vent in the cover and foam that acts as the cushion for the bed. This allows the bed to be packaged into a very small space and therefore reduces the shipping costs and therefore the purchase price.

Figure 1:
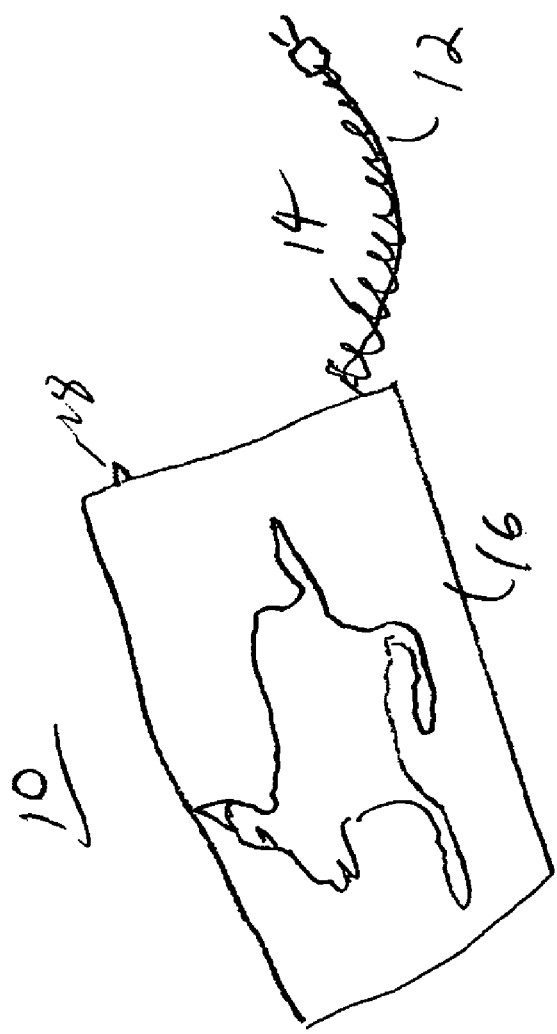
FIG. 1 is a perspective view of a heated pet bed in accordance with one embodiment of the invention.

FIG. 1 is a perspective view of a heated pet bed 10 in accordance with one embodiment of the invention. The heated pet bed 10 is shown with a dog lying on the bed 10. The bed 10 has an electrical cord 12. The electrical cord 12 is encircled by a metal spring (spiral) 14. The metal spring 14 prevents the dog or other animal from chewing through the cord 12 and destroying the bed 10. The bed 10 has a weather resistant cover 16 with an air vent 18. The air vent 18 allows the bed 10 to be compressed for shipping.

Figure 2:
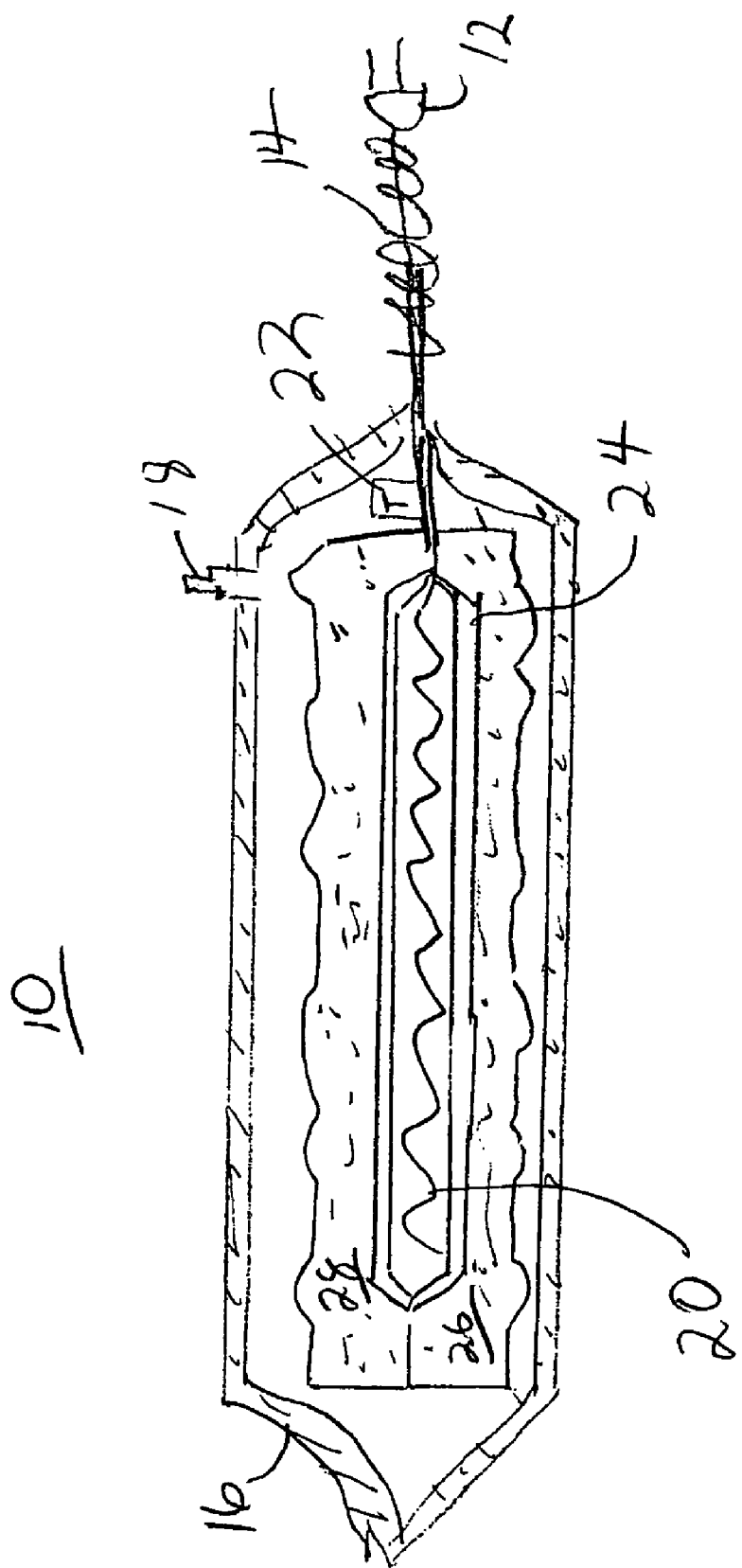
FIG. 2 is a cross sectional view of a heated pet bed in accordance with one embodiment of the invention.

FIG. 2 is a cross sectional view of a heated pet bed 10 in accordance with one embodiment of the invention. In the center of the bed 10 is a low wattage heating wire 20. The heating wire 20 is coupled to a thermostatic controller 22 and then to the cord 12. A metal foil packet 24 encompasses the heating wire 20 and is electrically grounded. A pair of foam layers 26, 28 encompass the foil packet 24. The foam layers 26, 28 are adhered to the foil packet 24 in one embodiment of the invention. The foam 26, 28 is encased in a weather resistant cover 16 that may be a plastic material. The cover 16 forms a water tight seal to protect the interior of the bed. An air valve 18 in the cover allows air to be removed from the foam and interior of the bed for shipping. In one embodiment, the foam 26, 28 is thermally insulating and fire retardant. The foil layer 24 has three functions. One is that the foil is an electrical ground for the heating wire 20. The second function is that the foil is a fire barrier and third the foil is a thermal insulating layer. Note that the foil 24 and heating wire 20 form a low wattage heater. In one embodiment, the heated pet bed has several thermostats. In another embodiment, the thermostat is placed inside the foam 26, 28 or inside the foil 24.

In operation, the foam layers 26, 28 form a thermally insulating layer. This allows a large difference in temperature between the outside of the cover 16 and the temperature of the heating wire 20. As a result, when a pet is not using the bed 10, the bed does not waste electrically energy by heating the surrounding air. When a dog (or other pet) lies on the bed 10, they compress the foam 26, 28 where they make contact with the bed 10. As a result, some of the air in that part of the foam is displaced and this reduces the insulating effect of the foam 26, 28. This allows the heating element 20, 24 to heat the dog's body effectively wherever the dog's body is in contact with the bed 10. As a result, heat is efficiently transferred to the dog's body without wasting heat into the surrounding atmosphere.

In one embodiment, the exterior is PVC which is both water proof and fire retardant. The foam surrounding the heater cuts down on power consumption and increases safety. The surface of the bed remains very slightly warm. When pressure is applied, such as a dog lying on it, it compresses the foam and brings the animal to within ¼" from the heating unit. This increases the warmth in just that area being used by the pet. In tests at ambient air temperature of 60 degrees Fahrenheit, the surface of the bed is approximately 80 degrees Fahrenheit. When a small, weighted object is placed on part of the surface of the bed, in minutes the temperature under the object is 100 degrees Fahrenheit. This is perfect as a dog's body temperature is approximately 101 degrees Fahrenheit. The rest of the bed remains at 80 degrees Fahrenheit. If the surface of the bed was at 100 degrees Fahrenheit even when not being used by a pet, the wattage would have to be much higher to get the heat to the surface of the foam. The air nozzle incorporated into the bed allows for economical shipping of this product. Foam is so light and bulky, it is one of the most expensive items to ship. The nozzle allows for nearly all air to be expelled from the product before shipping. The nozzle is opened and the air compressed out while the bed is flat so as to not damage the electrical components. Once the bed has reached it's final destination, the nozzle is simply opened and the foam interior self expands. The nozzle is then sealed. Never before has there been a soft, comfortable outdoor heated bed offered.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An outdoor heated pet bed, comprising:
a low wattage heating wire;
a foil packet enclosing the low wattage heating wire;
a foam layer adjacent to one side of the foil packet wherein the foil packet is electrically grounded and the foam layer is fire retardant and is glued to one side of the foil packet;
a weather resistant cover enclosing the foam layer and the foil packet, wherein the weather resistant cover is waterproof and the outdoor heated pet bed is collapsible and forms a sandwich between the low wattage heating wire, the foil packet, the foam layer and both a top and a bottom portion of the weather resistant cover wherein the low wattage heating wire, the foil pack, the foam layer and the top and the bottom portion of the weather resistant cover are in direct contact when a pet lies on the outdoor heated pet bed;
a thermostat controlling a current to the low wattage heating wire; and
an electrical cord covered by a metal spring that is electrically coupled to the low wattage heating wire.

2. The outdoor heated pet bed of claim 1, further including an air nozzle in the weather resistant cover.

3. A heated pet bed, comprising:
a low wattage heater;
a weather resistant cover enclosing the low wattage heater; and
an air nozzle in the weather resistant cover, wherein the weather resistant cover is waterproof and the heated pet bed is collapsible and forms a sandwich between the low wattage heater and a top and a bottom portion of the weather resistant cover weather resistant cover wherein the low wattage heater, a foil packet, a pair of foam layers and the top and the bottom portion of the weather resistant cover are in direct contact when a pet lies on the outdoor heated pet bed.

4. The heated pet bed of claim 3, further including the foil packet enclosing the low wattage heater.

5. The heated pet bed of claim 4, further including the pair of foam layers encompassing the foil packet.

6. The heated pet bed of claim 5, wherein the pair of foam layers are adhered to the foil packet.

7. The heated pet bed of claim 6, further including an electrical cord covered by a metal spring electrically coupled to the low wattage heater.

8. A heated pet bed comprising:
a low wattage heater;
an insulating layer surrounding the low wattage heater; and
a cover permanently enclosing the insulating layer, wherein the cover is water proof and the heated pet bed is collapsible and forms a sandwich between the low wattage heater, the insulating layer and a top and a bottom portion of the cover wherein the low wattage heater, a foil packet, a pair of foam layers and the top and the bottom portion of the weather resistant cover are in direct contact when a pet lies on the outdoor heated pet bed.

9. The heated pet bed of claim 8, wherein the cover includes an air nozzle in the cover.

10. The heated pet bed of claim 9, wherein the insulating layer is fire retardant.

11. The heated pet bed of claim 10, wherein the insulating layer is compressible.

12. The heated pet bed of claim 11, wherein the insulating layer is thermally insulating.

13. The heated pet bed of claim 12, wherein the insulating layer is less thermally insulating in a compressed state than a non-compressed state.

14. The heated pet bed of claim 10, wherein the insulating layer is electrically insulating.

* * * * *